United States Patent Office 3,212,874
Patented Oct. 19, 1965

3,212,874
PROCESS FOR THE PRODUCTION OF
PHOSPHATE FERTILIZER
Arthur N. Baumann, Lakeland, Fla., assignor to International Minerals & Chemical Corporation, a corporation of New York
No Drawing. Filed Jan. 10, 1963, Ser. No. 250,484
5 Claims. (Cl. 71—34)

This invention generally relates to the production of phosphate fertilizers. In a particular aspect it relates to a process for the production of phosphate fertilizers which contain at least fifty-four percent available phosphoric acid.

The commercial manufacture of fertilizers from phosphate rock, until recent years, has essentially contemplated only ordinary superphosphate and triple superphosphate. Ordinary superphosphate is manufactured by reacting phosphate rock with sulfuric acid. Triple superphosphate, sometimes referred to as "treble" or "double" superphosphate is the article of commerce used largely as a fertilizer. It is made by treating ground phosphate rock with phosphoric acid, or with a mixture of phosphoric acid and sulfuric acid. It has a $P_2O_5$ content of from about 45 to 50% $P_2O_5$ and is composed predominantly of monocalcium phosphate, $Ca(H_2PO_4)_2$, with small amounts of gypsum and fluorine compounds.

In recent years, consumers of fertilizers have urged the production of phosphate fertilizers of higher analysis than conventional triple superphosphate. The Tennessee Valley Authority sought to meet such demands by the development of a highly concentrated, so-called "super phosphoric acid," containing about seventy to seventy-five percent phosphorus pentoxide. Acidulation of phosphate rock with super phosphoric acid yields a fertilizer product containing an average of at least about fifty-four percent available phosphoric acid and characterized by acceptable proportions of water-soluble phosphorus pentoxide and citrate insoluble material. The production of super phosphoric acid is, however, beset by economic and other problems which have induced the fertilizer industry to seek an alternative route to the production of high analysis phosphate fertilizers.

Calcination of triple superphosphate has also been suggested as a method for obtaining a higher $P_2O_5$ product. While calcination of triple superphosphate does increase the total $P_2O_5$ content by driving off water, the increase in $P_2O_5$ is made at the sacrifice of available $P_2O_5$ content and ammoniation properties and at temperatures necessary to obtain a total $P_2O_5$ content of at least 54%, the water solubility and ammoniation characteristics are reduced to where the product is generally unsuitable for use in fertilizers.

It is, accordingly, an object of this invention to provide a new method for the production of high analysis phosphate fertilizers.

It is another object of the present invention to provide a process for the production from triple superphosphate and conventional wet process phosphoric acid containing not more than about sixty percent $P_2O_5$ of a granular phosphate fertilizer analyzing at least about fifty-four percent by weight available phosphoric acid determined as $P_2O_5$.

It is an additional object of the invention to provide a method for the production of high analysis phosphate fertilizers which does not entail utilization of super phosphoric acid.

These and other objects and advantages of this invention will be apparent from the description of the invention.

Generally described, the present invention is a process for the production of a phosphate fertilizer which comprises admixing triple superphosphate with phosphoric acid and calcining the admixture in the presence of steam at a temperature within the range of from about 350° F. to about 550° F. to produce a high APA phosphate fertilizer. As used in the specification and claims the term available phosphoric acid, commonly abbreviated to APA, is the sum of the water-soluble and the citrate-soluble phosphoric acid. The phosphoric acid content of fertilizers is expressed as weight percent phosphoric pentoxide ($P_2O_5$). The term "bone phosphate of lime," commonly abbreviated to BPL, is also commonly used to express the phosphate content of fertilizers. This is the equivalent of $Ca_3(PO_4)_2$. The citrate-soluble phosphoric acid is that part of the total phosphoric acid in a fertilizer that is insoluble in water but soluble in a solution of citrate of ammonia according to the method adopted by the Association of Official Agricultural Chemists (A.O.A.C.).

The invention generically contemplates triple superphosphate made from all of the various phosphate materials such as phosphate rocks and apatite minerals. Reference is made to the treatise by Waggaman entitled "Phosphoric Acid, Phosphates and Phosphatic Fertilizers," 2nd ed., 1952, for a disclosure of a representative group of phosphate rocks and apatites and the production of triple superphosphate. Representative phosphate materials include Florida pebble phosphate, Tennessee phosphates, phosphates from the western States of the United States, Senegalese phosphates, Israeli phosphates and the like. Triple superphosphate derived from Florida pebble phosphate is preferred.

Triple superphosphate of any suitable $P_2O_5$ content, preferably of at least 44% available $P_2O_5$ and more preferably of at least 46% available $P_2O_5$ content is used in the invention. The triple is preferably finely divided, appropriately of $-12$ mesh, and may be comminuted to this size when appropriate. The triple superphosphate used is preferably aged triple superphosphate as is conventional in its production.

In accordance with the present invention, the triple superphosphate is treated with phosphoric acid preferably containing at least five percent by weight $P_2O_5$. The treatment of the triple superphosphate with the phosphoric acid may be conducted in any suitable manner. In the preferred practice of the invention, the treatment of the triple superphosphate with the phosphoric acid is effected concurrently with granulation in any appropriate apparatus. The phosphoric acid is used in suitable amount which generally is to provide a calcined phosphate product containing at least about 50%, more preferably at least about 54% by weight total $P_2O_5$. Wet process phosphoric acid is eminently suitable for use. Furnace phosphoric acid and mixtures of furnace and wet process acid may also be used when desired.

The phosphoric acid used preferably contains at least about five percent, more preferably about twenty percent to about sixty percent by weight phosphorus pentoxide, and is employed in a concentration in an amount requisite to provide a calcined composition containing at least about fifty percent, preferably fifty-four to about sixty percent by weight phosphorus pentoxide on a dry basis. Using phosphoric acid having a concentration within the range of 20 to 60% $P_2O_5$, and triple superphosphate of from about 45% to about 49% $P_2O_5$ content, the amount of phosphoric acid used is appropriately from about 1% to about 20% by weight of the triple superphosphate acidulated, more specifically about 2.5% by weight of 27% $P_2O_5$ wet process phosphoric acid. In general, when the treatment of the triple superphosphate with the phosphoric acid is effected concurrently with granulation, the concentration of the phosphoric acid utilized is somewhat dependent on the particle size of the triple superphosphate with the concentration of the acid used generally being less for the more finely divided material.

The process of this invention may be carried out by treating triple superphosphate of at least 44% available $P_2O_5$ content with about 1 to about 20% by weight of phosphoric acid containing at least 5% by weight $P_2O_5$, and calcining the reaction mixture at a temperature within the range of from about 350° F. to about 550° F. in a gaseous atmosphere containing at least 5 mole percent $H_2O$ as steam to produce a substantially anhydrous calcination product substantially free of crystalline calcium metaphosphates and containing at least about 50% available phosphoric acid.

The process of this invention may also be carried out by treating triple superphosphate of at least 46% available $P_2O_5$ content with phosphoric acid containing from about 5% to about 60% by weight $P_2O_5$, said phosphoric acid used in an amount of from about 1% to about 20% by weight of said triple superphosphate, and calcining the reaction mixture at a temperature of from about 380° F. to about 420° F. in a gaseous atmosphere containing from about 10 to about 40 mole percent $H_2O$ as steam for a time period of from about 5 minutes to about 4 hours to produce a substantially anhydrous calcination product substantially free of crystalline calcium metaphosphates and containing at least 54% available phosphoric acid.

In accordance with the present invention the admixture of triple superphosphate and phosphoric acid is heated to a temperature in the range of from about 350° F. to about 550° F., preferably from about 380° F. to about 420° F. to produce a substantially anhydrous calcination product containing at least about fifty-four percent, preferably about fifty-seven to about sixty-five percent by weight phosphorus pentoxide. The temperature observed in the calcination will vary, within the limits of about 350° F. to about 550° F., with the quantity of phosphorus pentoxide in the calciner feed and is adjusted to produce a calcination product containing at least about fifty-four percent by weight phosphorus pentoxide. The residence time in the calcination step is maintained to obtain desirable citrate and water solubility characteristics in the calcined product. The calcination period is suitably more than about five minutes and less than about four hours.

It is apparent that the formation of a calcination product analyzing at least fifty-four percent by weight available phosphorus pertoxide requires some conversion of the orthophosphates present in the starting material to a less hydrated form. However, the success of the calcination significantly depends upon control of the conditions to provide a calcination product containing amorphous calcium polyphosphates and calcium acid pyrophosphates but substantially free of crystalline calcium metaphosphates.

The amorphous calcium polyphosphates present in the calcination product are to be distinguished from the various crystalline calcium metaphosphates which are formed by calcination of monocalcium orthophosphate and calcium acid pyrophosphates at temperatures in excess of 550° F.

The formation of calcination products of suitable composition is in part achieved by observation of the upper calcination limit of 550° F. The formation of pyrophosphates is effectively minimized by conducting the calcination in an atmosphere of steam. For example, steam may be injected into the calciner. Alternatively, a direct-fired rotary kiln or comparable apparatus may be utilized, in which steam is introduced concurrently with the combustion gases. The calcination atmosphere should contain at least 5 mole percent $H_2O$ as steam and preferably from about 10 to about 40 mole percent $H_2O$ as steam.

The importance of steam in the calcining atmosphere is demonstrated by the following data obtained in a series of tests in which C.P. grade monocalcium phosphate, the principal constituent of triple superphosphate, was calcined for one hour at 500° F. with various amounts of water in the atmosphere.

| Percent $H_2O$ in atmosphere | 0 | 7 | 25 | 48 |
|---|---|---|---|---|
| Products water soluble $P_2O_5$ | 9.8 | 31.8 | 56.6 | 60.4 |

The data show that an atmosphere containing at least 5 mole percent $H_2O$ as steam is necessary in order to maintain a satisfactory water solubility in the product and at least 10 mole percent $H_2O$ as steam is preferable.

The calcined product is appropriately cooled and recovered as a product of the process. In some events the calcium phosphate product may be comminuted to produce a more finely divided product.

The product of this invention exhibits a good theoretical ammonia absorption, generally from about 2.3 to about 3.0 lbs. $NH_3$ absorption per unit (20 pounds of $P_2O_5$ in a unit) of APA.

In order to give a fuller understanding of the invention, but with no intention to be limited thereto, the following specific examples are given:

EXAMPLE I 400 grams of —16 mesh run-of-pile triple superphosphate analyzing 47% APA was mixed in a pug mill with a mixture of 10 grams of 27% $P_2O_5$ wet process phosphoric acid and 20 grams of $H_2O$. This mixture was calcined at a temperature of 390° F.±10° F. for various times with ¼ cubic foot of air containing 25 mole percent $H_2O$ as steam passing over the sample. The following results were obtained:

Table 1

| Time | Wt. Percent Total $P_2O_5$ | Wt. Percent APA | Wt. Percent Water Soluble $P_2O_5$ | Ammonia Absorption lbs. $NH_3$/20 lbs. of APA |
|---|---|---|---|---|
| ½ hr | 53.6 | 51.9 | 40.0 | 2.98 |
| ¾ hr | 54.2 | 52.9 | 44.3 | 2.86 |
| 1 hr | 55.4 | 54.0 | 43.4 | 2.72 |
| 2 hrs | 57.0 | 55.7 | 42.0 | 2.31 |

The data in Table 1 illustrates the production of a high analysis phosphate material in accordance with the present invention.

EXAMPLE II

In this example, the method of practicing the invention as described in Example I was substantially repeated except that the mixture was calcined in the steam atmosphere for one hour at a temperature controlled within the range of 455° F. to 480° F. The following results were obtained:

Table 2

| Time | Wt. Percent Total $P_2O_5$ | Wt. Percent APA | Wt. Percent Water Soluble $P_2O_5$ | Ammonia Absorption lbs. $NH_3$/20 lbs. of APA |
|---|---|---|---|---|
| 1 hr | 57.9 | 55.8 | 24.0 | 1.24 |

This example illustrates that a high APA product may be obtained at higher calcination temperatures than used in Example I; however, the water solubility and ammonia absorption are less. If the calcination time were decreased to lesss than one hour, however, the water solubility and ammonia absorption properties would generally increase. The preferred upper temperature limit is, however, 420° F. as is described herein.

EXAMPLE III

In this example 200 grams of the same −16 mesh run-of-pile triple superphosphate as used in Example I was mixed in a pug mill with a mixture of 15 grams of 27% $P_2O_5$ wet process phosphoric acid and 10 grams of $H_2O$. This mixture was calcined at the conditions described in Example I for one hour. The following results were obtained.

*Table 3*

| Time | Wt. Percent Total $P_2O_5$ | Wt. Percent APA | Wt. Percent Water Soluble $P_2O_5$ | Ammonia Absorption lbs. $NH_3$/20 lbs. of APA |
|---|---|---|---|---|
| 1 hr | 56.3 | 54.9 | 46.7 | 2.84 |

The data in Table 3 further illustrates the production of a high analysis phosphate material in accordance with the present invention.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

I claim:

1. A process for the production of a high analysis phosphate fertilizer containing at least about fifty percent by weight available phosphoric acid, determined as $P_2O_5$, which comprises treating solid triple superphosphate of at least 44% available $P_2O_5$ content with 1 to 20% by weight of phosphoric acid containing at least 5% by weight $P_2O_5$, and calcining the reaction mixture at a temperature within the range of from about 350° F. to about 550° F. in a gaseous atmosphere containing at least 5 mole percent $H_2O$ as steam to produce a substantially anhydrous calcination product which contains calcium phosphates, is substantially free of crystalline calcium metaphosphates and contains at least about 50% available phosphoric acid.

2. The process of claim 1 wherein said reaction mixture is calcined for a time period of from about 5 minutes to about 4 hours to produce a product containing at least about 54% available phosphoric acid.

3. The process of claim 1 wherein said reaction mixture is calcined at a temperature within the range of from about 380° F. to about 420° F.

4. The process of claim 1 wherein said gaseous atmosphere contains from about 10 to about 40 mole percent $H_2O$ as steam.

5. A process for the production of a high analysis phosphate fertilizer containing at least about 54% by weight available phosphoric acid, determined as $P_2O_5$, which comprises treating solid triple superphosphate of at least 46% available $P_2O_5$ content with phosphoric acid containing from about 5% to about 60% by weight $P_2O_5$, said phosphoric acid used in an amount of from about 1% to about 20% by weight of said triple superphosphate, and calcining the reaction mixture at a temperature of from about 380° F. to about 420° F. in a gaseous atmosphere containing from about 10 to about 40 mole percent $H_2O$ as steam for a time period of from about 5 minutes to about 4 hours to produce a substantially anhydrous calcination product which contains calcium phosphates, is substantially free of crystalline calcium metaphosphates and contains at least 54% available phosphoric acid.

References Cited by the Examiner

UNITED STATES PATENTS

| | | | |
|---|---|---|---|
| 2,895,799 | 7/59 | Le Baron et al. | 71—44 |
| 2,962,357 | 11/60 | Williams et al. | 71—44 |
| 3,074,780 | 1/63 | Smalter | 71—44 |
| 3,078,156 | 2/63 | Yamaguchi | 71—44 |
| 3,099,530 | 7/63 | Nickerson | 71—44 |

DONALL H. SYLVESTER, *Primary Examiner.*

ANTHONY SCIAMANNA, *Examiner.*